United States Patent [19]

Look et al.

[11] Patent Number: 5,052,242
[45] Date of Patent: Oct. 1, 1991

[54] CONTROL DEVICE FOR A DERAILLEUR-GEAR FOR A BICYCLE

[75] Inventors: Günter Look, Bergrheinfeld, Fed. Rep. of Germany; Régis Sinoquet, Fressenneville, France

[73] Assignee: Sachs Industries S.A., Nanterre, France

[21] Appl. No.: 386,357

[22] Filed: Jul. 27, 1989

[30] Foreign Application Priority Data

Jul. 29, 1988 [FR] France ............................. 88 10320

[51] Int. Cl.⁵ ............................................. F16C 1/10
[52] U.S. Cl. .................................... 74/502.2; 74/489; 74/527; 74/531
[58] Field of Search .................... 74/502.2, 489, 531, 74/527, 475, 488

[56] References Cited

U.S. PATENT DOCUMENTS

| | | | |
|---|---|---|---|
| 2,986,362 | 5/1961 | Gimalouski | 74/502.2 X |
| 3,915,029 | 10/1975 | Shimada | 74/502.2 |
| 3,943,794 | 3/1976 | Shimada | 74/502.2 |
| 4,007,645 | 2/1977 | Dove et al. | 74/502.2 |
| 4,046,025 | 9/1977 | Ozaki | 74/502.2 |
| 4,521,650 | 6/1985 | Oswald | 74/531 X |
| 4,742,728 | 5/1988 | Nagano | 74/531 X |

FOREIGN PATENT DOCUMENTS

| | | | |
|---|---|---|---|
| 3200562 | 7/1983 | Fed. Rep. of Germany . | |
| 2578506 | 9/1986 | France . | |
| 2579163 | 9/1986 | France . | |
| 478734 | 3/1953 | Italy | 74/489 |
| 996465 | 6/1965 | United Kingdom | 74/502.2 |

Primary Examiner—Rodney M. Lindsey
Attorney, Agent, or Firm—Trexler, Bushnell, Giangiorgi & Blackstone, Ltd.

[57] ABSTRACT

This device, of the type comprising a fixed part including a support element (1) adapted to be fixed on one part of the frame or the handle bar of the bicycle and a moveable part (2) including an operating hand-lever (3) which can rotate relative to the support element, a control mechanism (9) of which a first part (11) co-operates with the fixed part of the device and of which a second part (10) co-operates with the moveable part of the latter and a cable for actuation of the derailleur-gear, is characterized in that the cable for acutation of the dérailleur-gear is connected to an actuation plug (4), rotated by the operating hand-lever (3) and on which are provided the control mechanism (9) and the means (16) for attaching the moveable part of the device to the fixed part of the latter.

29 Claims, 6 Drawing Sheets

FIG_1

FIG. 2

FIG_3

FIG. 4

FIG_5

FIG_6

FIG_7

FIG_8

FIG_9

FIG_10

FIG.11

FIG_12

FIG_13

FIG_14

CONTROL DEVICE FOR A DERAILLEUR-GEAR FOR A BICYCLE

The present invention relates to a control device for a dérailleur-gear for a bicycle.

Some control devices of this type are already known in the state-of-the-art technology, which comprise a fixed part having a support element adapted to be fixed on one part of the frame or handle bar of the bicycle and a moveable part comprising an operating hand-lever which can be rotated relative to the support element, a control mechanism of which a first part co-operates with the fixed part of the device and of which a second part co-operates with the moveable part of the latter, and a cable for actuation of the dérailleur-gear.

Such devices are known for example from documents EP-A-0 157 983 on behalf of SHIMANO and FR-A-2 574 364 on behalf of the Applicant.

Furthermore, two main types of control mechanisms also exist, one type comprising friction means positioned between the lever and the support element and the other type being provided with indexing means between these elements.

These indexing means comprise notches with equivalent means which enable various positions of the hand-lever to be determined accurately, which correspond to the establishment of various velocity ratios.

It can be understood that the construction of such devices is extremely complex, due to the large number of parts which make up these devices, and that the assembly of these devices is very lengthy and tedious, also because of the large number of parts which must be assembled one after the other inside the support element.

The aim of the invention is, therefore, to solve these problems by putting forward a device which, while ensuring the same functions as the devices of the state-of-the-art technology, has a simpler construction and which can be much more easily assembled.

To this effect, the subject of the invention is a control device for a dérailleur-gear for a bicycle, of the type as described previously, characterized in that the cable for actuation of the dérailleur-gear is connected to an actuation stud rotated by the operating hand-lever, and on which are provided the control mechanism and the means for attaching the moveable part of the device to the fixed part of the latter.

Advantageously, the attachment means include a ring placed around a section of the stud between the control mechanism and the rest of the stud and comprising retaining means adapted to co-operate with the complementary means of the support element so as to lock the ring in position on the latter, and therefore to maintain the moveable part of the device on the fixed part of the latter.

According to another characteristic, the means of retaining the ring and the complementary means of the support element are adapted to ensure the locking of the ring in various angular positions relative to the support element so as to allow regulation of the angular position of the operating hand-lever relative to the support element.

The invention will be better understood from the description which follows, given only as an example and made with reference to the attached drawings, on which.

Figure 1:
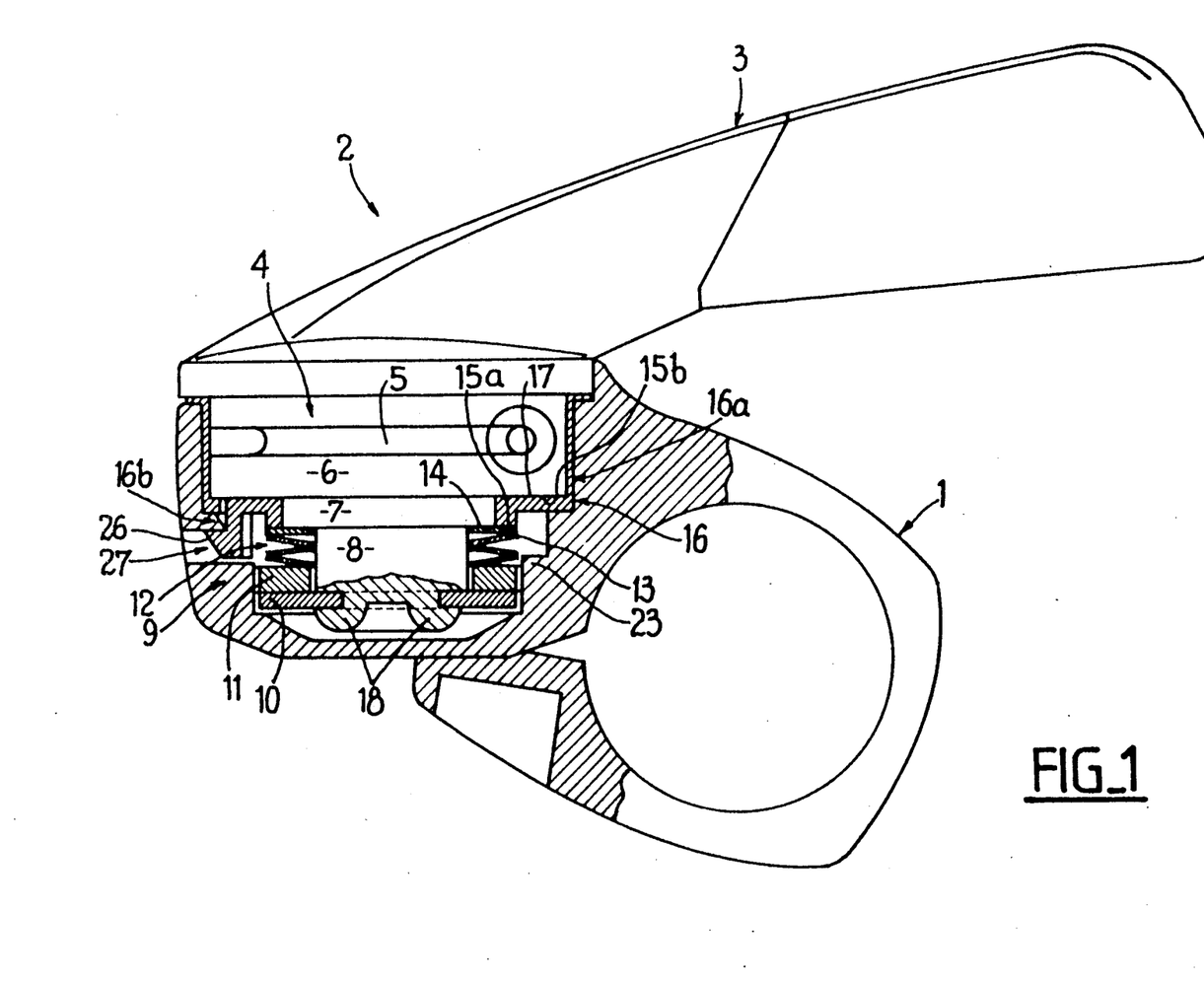
FIG. 1 is a sectional view of a control device according to the invention, comprising a friction control mechanism.
Figure 2:
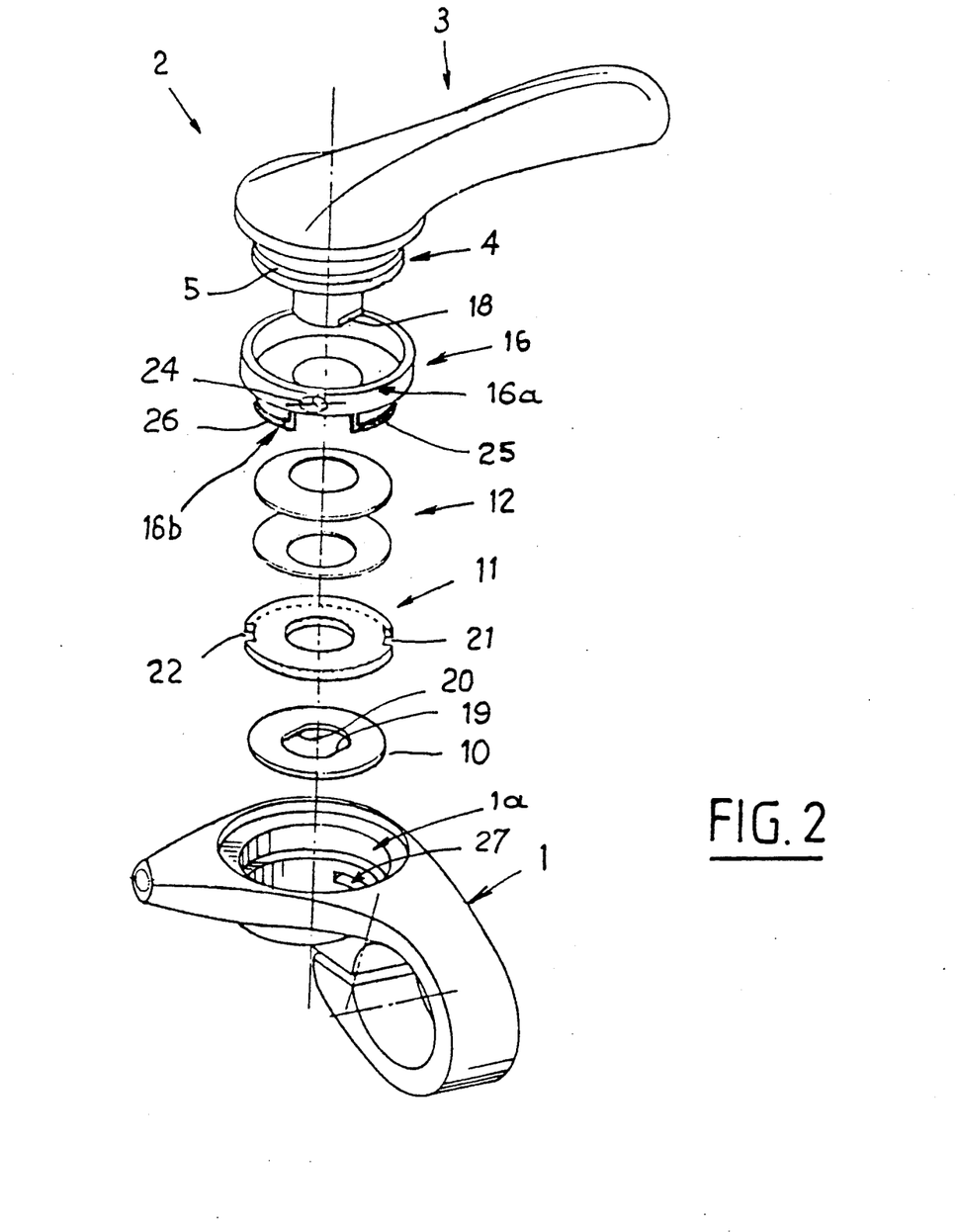
FIG. 2 is an exploded perspective view of a device similar to that represented in FIG. 1.

As can be seen from FIGS. 1 and 2, a control device for a dérailleur-gear for a bicycle, according to the invention, comprises in a manner known per se, a fixed part comprising a support element 1 adapted to be fixed, in a manner known per se, on a part of the frame or the handle bar of the bicycle and a moveable part 2 adapted to engage, for example, in a stepped and blind hole 1a (FIG. 2) in the support element.

This moveable part comprises, in a manner known per se, an operating hand-lever 3 rotationally moveable relative to the support element and adapted to be actuated by the user in order to operate the dérailleur-gear.

According to the invention, this operating hand-lever 3 is connected to an actuation stud 4 which, for example, is in one with this lever and extending into the blind hole of the support element. The actuation stud comprises a groove 5 for receiving and attaching the cable for actuation of the dérailleur-gear (not shown), arranged in a first part 6 of the latter. This stud is for example in the form of a stepped cylindrical element having respectively the first part 6 described previously, a second part 7 and a third part 8, of successively smaller sections and of which the functions will be described in more detail later on.

In the embodiment shown in these FIGS. 1 and 2, the control device according to the invention also comprises a control mechanism 9, for example a friction control mechanism. This friction control mechanism comprises a first washer 10 fixed to the end of part 8 of the actuation stud for rotation with the latter. A flat surface of this washer co-operates with a corresponding surface of a second washer 11 placed above the first, around part 8 of the actuation stud. This second washer 11 is pressed against the first washer 10 by elastic means 12. These elastic means 12 rest against a third washer 13, itself resting against a support area 14 of the second part 7 of the stud 4 and a first support area 15a of a ring 16 for attaching the moveable part of the device to the fixed part of the latter. The ring 16 has a second support area 15b resting against an abutment 17 of the first part 6 of the actuation stud 4.

The control mechanism 9 and the ring 16 are therefore maintained on the actuation stud 4 between the first washer 10 of the control mechanism. Which is fixed to the end of the stud and the abutment 17 of the stud.

The first washer 10 of the control mechanism of the device according to the invention is fixed to the end of the actuation stud 4 by, for example, curved projections 18 of the latter and is locked against rotation relative to it by, for example, flat surfaces 19 and 20 (FIG. 2) provided on the washer and adapted to co-operate with the similarly-shaped parts of the end of the stud. The washer 10 is therefore rotated by the operating hand-lever 3 and the actuation stud 4 under the control of the user.

The second washer 11 of the control mechanism is itself fitted rotationally free about the actuation stud 4 and has on its edge recesses, for example 21 and 22 (FIG. 2) adapted to co-operate with complementary projections, for example 23 (FIG. 1), of the fixed part of the device, for locking this washer in rotation relative to the support element and thus allowing a movement with friction between these two washers 10 and 11, when the user actuates the operating lever 3.

In the example shown in FIG. 1, the elastic means 12 can be constituted for example by a coil spring, or as shown in FIG. 2, by two elastic washers placed one above the other.

The ring 16 itself comprises a first part 16a placed around the first part 6 of the actuation stud and having a cavity 24 (FIG. 2) for the passage of the cable for actuation of the dérailleur-gear. This ring also has a second part 16b provided with projections, for example 25, 26, in the form of elastically deformable claws, which form the retaining means, adapted to co-operate with the abutments of the fixed part of the device in order to maintain the moveable part of the device on the fixed part of the latter. These abutments are for example in the form of grooves 27 running towards the outside of the support element, into which the projections of the ring engage, so as to maintain the moveable part of the device constituted by the operating hand-lever 3, the actuation stud 4 and the control mechanism 9 in position, for example in the blind hole of the support element.

As will be described in more detail later on, the means of attaching the moveable part of the device to the fixed part can be constituted by means having forms other than the elastic claws described in these Figures. It should also be noted that the fixed part of the device, and more particularly the support element, can comprise one or more sets of abutments such as the grooves 27, angularly offset to allow the ring 16 to be locked in various angular positions relative to the support element, in order to enable regulation of the angular position of the operating hand-lever relative to the support element.

In the example illustrated in these FIGS. 1 and 2, the attaching ring 16 has three projections in the form of claws 25, 26, offset at 120° and adapted to co-operate with three complementary grooves 27 in the support element. It goes without saying that a different number of projections can be used.

These claws, for example 26 (FIG. 1), can be elastically connected to the rest of the ring 16, so as to allow their engagement in the grooves of the support element by embedding the moveable part in the blind hole 1a of this element and their disengagement from the grooves constituting the abutments of the support element, for example by a suitable tool, engaged in the grooves 27 of the support element, in order to enable the claws to be removed from the grooves of the support element and therefore the moveable part of the device to be separated from the fixed part of the latter.

Friction, as has been mentioned previously, is thus ensured by the washers 10 and 11 and more particularly by the flat surfaces of these latter which rest against each other, one of the washers being rotated by the lever and the stud and the other being fixed against rotation relative to the support element.

Figure 3:
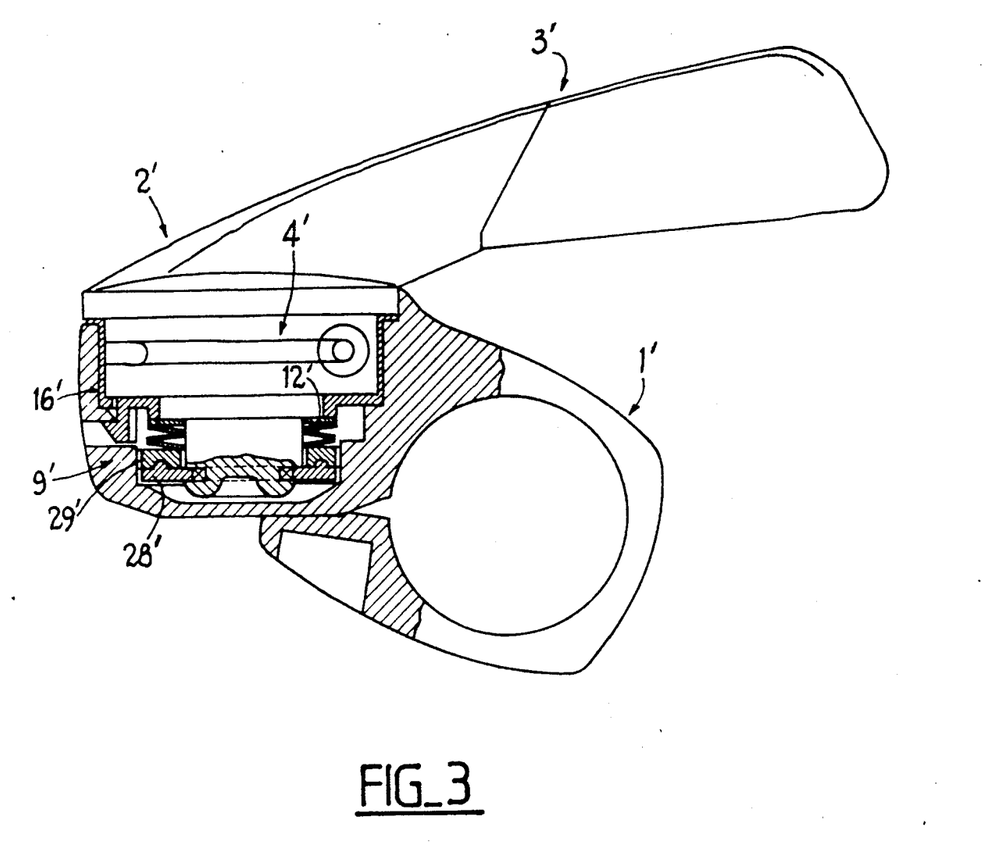
FIG. 3 is a sectional view of a control device according to the invention, comprising an indexing control mechanism.
Figure 4:
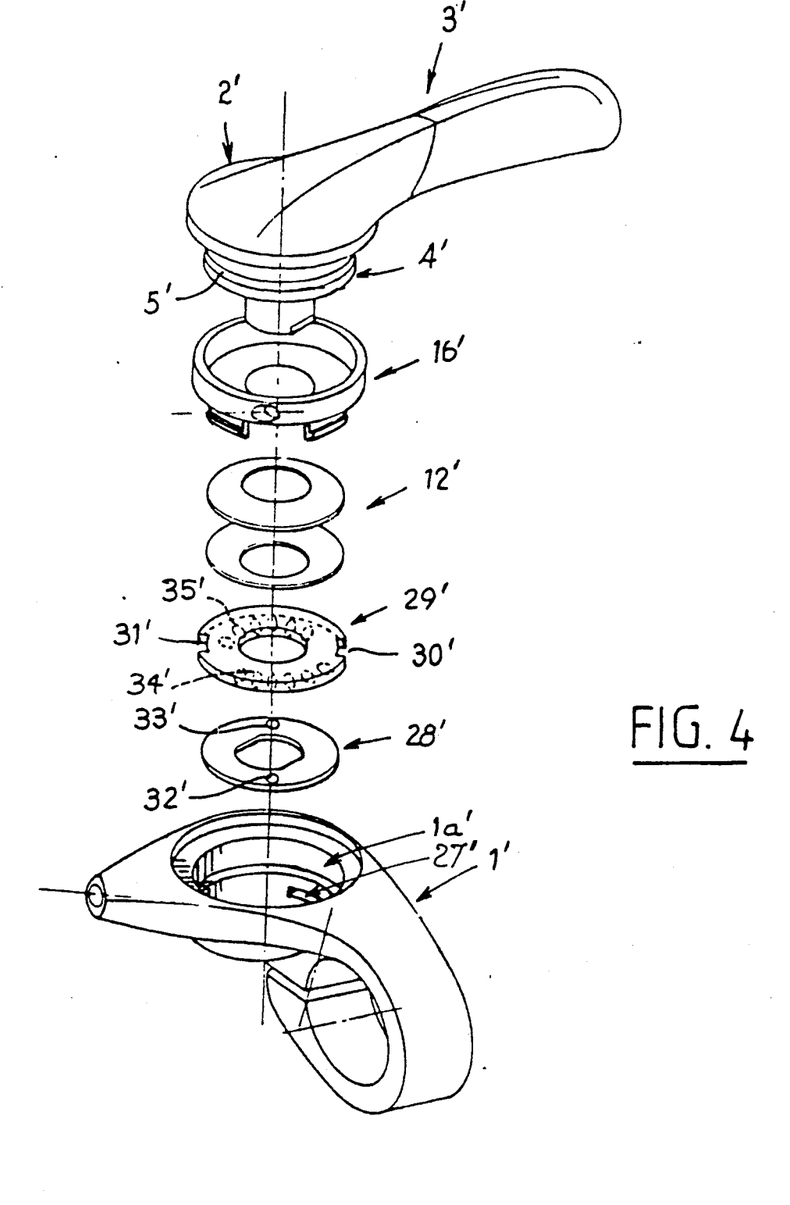
FIG. 4 is an exploded perspective view of a device similar to that represented in FIG. 3.

It goes without saying that an indexing control mechanism can also be provided in place of the friction mechanism, as shown in FIGS. 3 and 4.

These Figures show a control device provided with indexing means, the general construction of the control device being similar to that described with regard to FIGS. 1 and 2 and therefore not being given in detail again.

In effect, the device shown in FIGS. 3 and 4 still comprises an operating hand-lever 3', the actuation stud 4' of the dérailleur-gear cable, on which are provided the control mechanism 9' and the attachment ring 16', as well as the various elements described previously.

The control mechanism includes a first washer 28' fixed to the end of the actuation stud 4' and so rotated by the latter, like the washer 10' of the first embodiment shown in FIGS. 1 and 2. This first washer 28' is rotationally moveable relative to a second washer 29' placed around the stud 4'. This washer 29' is pressed by elastic means 12', described previously, in the direction of the first washer and is locked against rotation relative to the support element 1' by recesses 30' and 31' (FIG. 4) which are similar to the recesses 21' and 22' described with regard to FIG. 2, co-operating with corresponding projections of the support element.

The part of the device which has just been described is therefore identical to that described with regard to FIGS. 1 and 2.

However, the surfaces of the washers 28' and 29' have complementary projections and recesses or notches which ensure indexing between the moveable part and the fixed part of the device.

Thus for example, as shown more clearly in FIG. 4, the washer 28' has two bosses 32' and 33', diametrically opposed and adapted to co-operate with two sets of recesses or notches 34', 35' angularly offset so as to ensure indexing between the two parts of the device.

Of course, the projections 32' and 33' of the washer 28' can be replaced by cavities for receiving balls adapted to co-operate with the sets of recesses or notches 34' and 35' or other equivalent means, for ensuring the same function of indexing as the bosses.

Since the other parts of the device are identical, they will not be described in more detail.

It can be understood therefore that the device comprises on the one hand a fixed part including the support element which is adapted to be fixed on a part of the frame or on the handle bar of the bicycle and on the other hand a moveable part on which are provided all the parts of the control mechanism and the means for attaching this moveable part to the fixed part of the device.

In effect, this moveable part comprises the operating hand-lever 3' rotating the actuation stud 4' to which is connected the cable for actuation of the dérailleur-gear, this actuation stud carrying the control mechanism and a ring for attaching this sub-assembly to the support element.

The control device according to the invention is assembled, therefore, by making on the one hand a moveable part of the device, by placing around the actuation stud, the attachment ring 16', optionally the third washer 13', the elastic means 12', the second washer 11' and then the first washer 10' which is fixed to the end of the actuation stud 4'. This sub-assembly consists, then, of a single part and can be fixed very easily inside the blind hole of the support element 1' by the claws of the ring.

It goes without saying that other embodiments of the attachment means can be envisaged, just as the support element can have a different form to that shown.

In effect, and as can been seen from FIGS. 5, 6, 7, 8 and 9, the moveable part of the device can also be in the form of a sub-assembly 36 (FIG. 5) comprising a ring 37 for attachment to the support element, provided with lateral projections 38 adapted to co-operate with the abutments of a support element such as support elements 39, 40, 41 and 42 represented respectively in FIGS. 6 to 9. These abutments are for example constituted by a support shoulder 39a, 40a, 41a, 42a, adapted to co-operate with the projections of the ring in order to keep the said moveable part of the device on the fixed part of the latter.

It goes without saying that the projections can for example be in the form of claws adapted to bend over the shoulder of the support element by being deformed elastically, so as to take up a position of engagement behind the shoulder.

Figure 5:
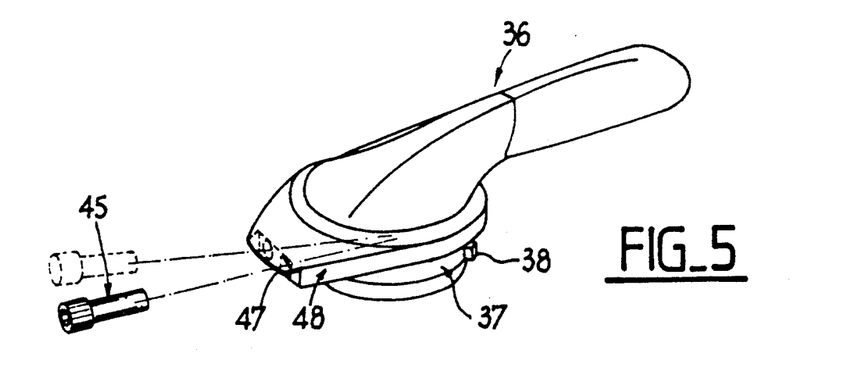
FIG. 5 is a perspective view of a moveable part which goes to make up a control device according to the invention.
Figure 6:
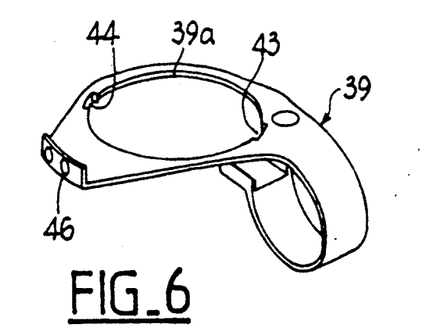
FIGS. 6, 7, 8 and 9 are various embodiments of a fixed part which goes to make up a device according to the invention.

The shoulder of the support element can also comprise two passages, for example 43 and 44 for the shoulder 389a of the support element 39 shown in FIG. 6, these passages enabling the projections, for example 38, of the moveable part of the device to be fitted behind the shoulder 39a so as to bring them into a position of engagement. The locking in position of the ring and therefore of the moveable part of the device in the support element is then ensured for example by an end stop 45 (FIG. 5) of the sheath of the cable for actuation of the dérailleur-gear. This stop is adapted to co-operate with at least one cavity of the support element, for example 46 for the support element 39 shown in FIG. 6 and at least one cavity, for example 47 (FIG. 5) provided in a projecting part 48 of the ring, so as to lock the latter against rotation relative to the support element.

It goes without saying that the support element and the ring can have several cavities 46 and 47, angularly offset to enable adjustment of the angular position of the ring relative to the support element and therefore of the operating hand-lever relative to the latter.

Figure 7:
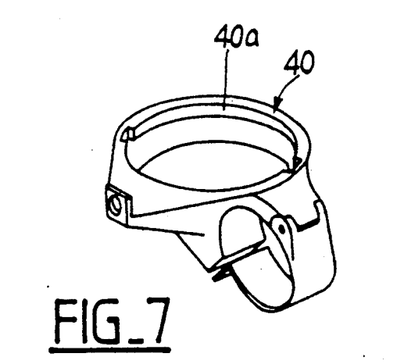
Figure 8:
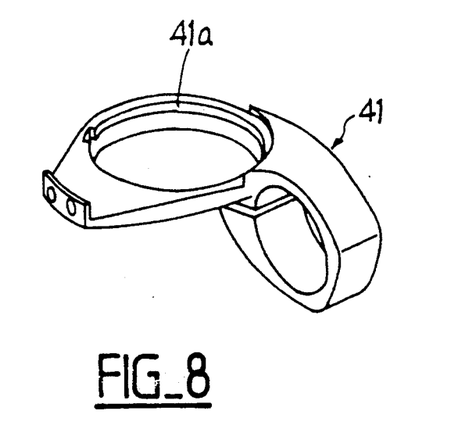
Figure 9:
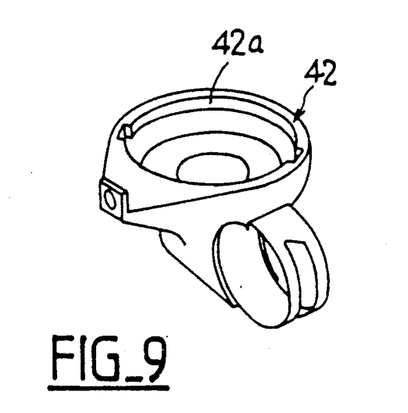

Thus for example in FIG. 5, the ring 37 has two angularly offset cavities, while in FIGS. 6 and 8, the support elements 39 and 41 have two angularly offset cavities and in FIGS. 7 and 9, the support elements 40 and 42 have only one cavity, these cavities being arranged for example in the curved parts of these elements.

It goes without saying that the means for locking against rotation of the ring relative to the support element can be constituted by means other than the end stop of the sheath of the cable for actuation of the dérailleur-gear.

Figure 10:
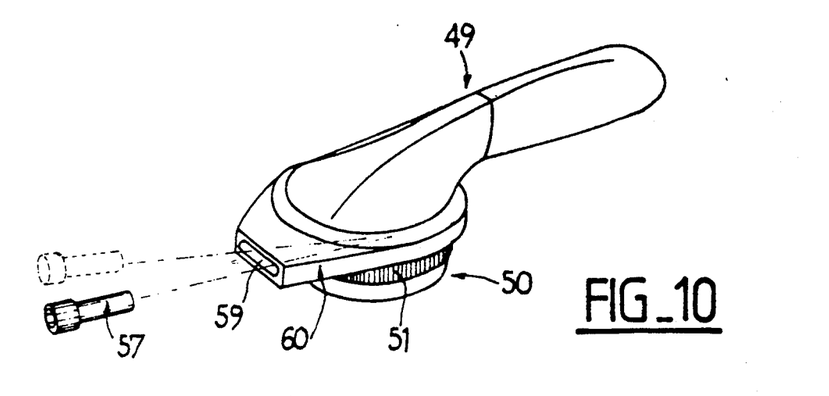
FIG. 10 is a perspective view of another embodiment of a moveable part which goes to make up a device according to the invention.

As can be seen in FIG. 10, which shows another embodiment of a moveable part 49 of a device according to the invention, this part can include a ring 50 having a toothed rim 51 adapted to co-operate with a complementary toothed rim of a support element, for example 52, 53, 54 or 55, shown in FIGS. 11 to 14. These support elements contain a complementary toothed rim, for example 56 for the support element 52 shown in FIG. 11, adapted to co-operate with the toothed rim 51 of the ring 50 of the moveable part 49 so as to ensure that it is locked against rotation in various angular positions relative to the support element.

Figure 11:
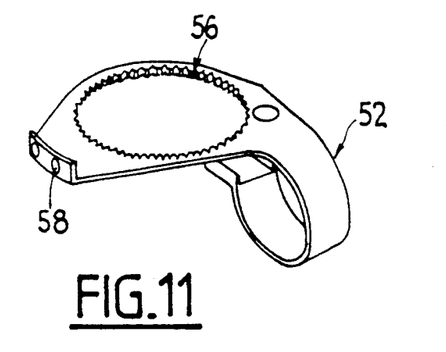
FIGS. 11, 12, 13 and 14 are various embodiments of a fixed part which goes to make up a device according to the invention.
Figure 12:
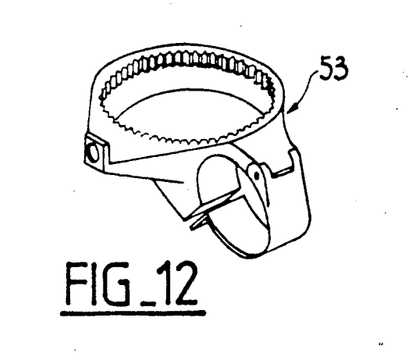
Figure 13:
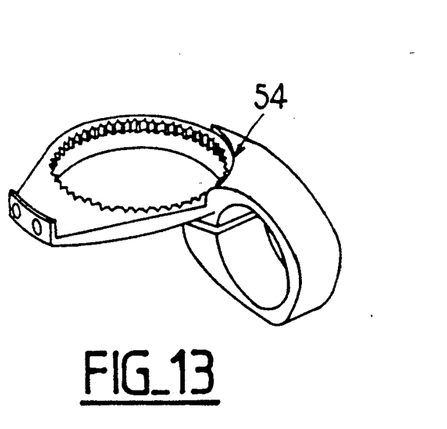
Figure 14:
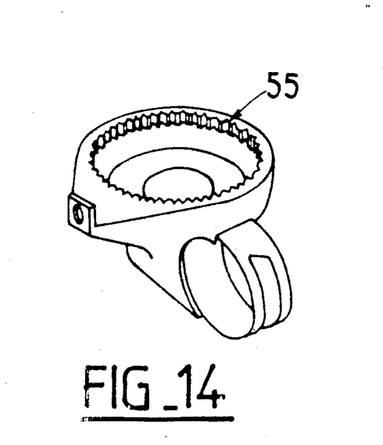

As already described with regard to FIGS. 5 to 9, the locking in position of the moveable part of the device on the fixed part of the latter can be ensured for example by an end stop of the sheath 57 of the cable for actuation of the dérailleur-gear, this stop being adapted to co-operate with at least one cavity of the support element such as the cavity 58 for the support element 52 shown in FIG. 11 and at least one cavity 59 arranged in a projecting part 60 of the ring 50 of the moveable part, so as to fix this in position on the support element.

It goes without saying that the support element, for example 52, and the ring 50, can contain several cavities 58 and 59 respectively, angularly offset so as to enable the locking of this ring in various angular positions relative to the fixed part of the device in order to enable adjustment of the angular position of the moveable part of the device relative to the fixed part of the latter.

It also goes without saying that the cavity 59 can be constituted by an oblong hole enabling this adjustment to be made.

Furthermore, the lever and the actuation stud can also be connected by releasable driving means with co-operating shapes, so as to enable adjustment of the position of the lever relative to the stud in order to adapt the initial position of the lever more accurately for example to the shape of the bicycle handle bar. In this case, the fixing of the lever on the stud is ensured for example by a clamp screw. The releasable driving means can be constituted for example by complementary toothed rims co-operating to drive the stud under the control of the lever.

It can be understood that due to its two-part construction, the device according to the invention can be easily assembled and adjusted. It is also very easy to fit either a device with a friction control mechanism or a device with an indexing control mechanism into identical supports, which makes it easy to standardize their manufacture.

We claim:

1. Control device of a dérailleur-gear for a bicycle of the type comprising a fixed part (1;39,40,41,42;52,53,54,55) comprising a support element adapted to be fixed on a part of the frame or the handle bar of the bicycle and a moveable part (2;36;49)comprising an operating hand-lever (3) which can rotate relative to the support element, a control mechanism (9) of which a first part (11;29) co-operates with the fixed part of the device and of which a second part (10;28) co-operates with the moveable part of the latter and a cable for actuation of the dérailleur-gear, characterized in that the cable for actuation of the dérailleur-gear is connected to an actuation stud (4), rotated by the operating hand-lever (3) and to which are secured the control mechanism (9) and means (16;37;50) for attaching the moveable part of the device to the fixed part of the latter, wherein said attachment means comprises a ring (16;37;50) placed around a part (6) of the stud (4) between the control mechanism (9) and the rest of the stud and including retaining means (25,26;38,47;51,59) adapted to co-operate with complementary means (27;45,46;39a,40a,41a,42a; 56,57,58) of the support element to lock the ring in position on the latter and therefore to maintain the moveable part of the device on the fixed part of the latter.

2. Device according to claim 1, characterized in that the control mechanism (9) and the attachment means (16) are maintained on the stud between lateral projections (18) on the end of the latter and an abutment (17) of the stud.

3. Device according to claim 1, characterized in that the ring (16) has a cavity (24) for passage of the cable for actuation of the dérailleur-gear, this cavity being arranged with regard to a groove (5) for receiving the cable, provided on the stud (4).

4. Device according to claim 1, characterized in that the retaining means (25,26;38,47;51,59) of the ring (16;37;50) and the complementary means (27;45,46;39a,40a,41a,42a,57,58) of the support element are adapted to enable the ring to be locked in various angular positions relative to the support element in order to enable adjustment of the angular position of the operating hand-lever (3) relative to the support element (1).

5. Device according to claim 1, characterized in that the retaining means and the complementary means include at least one projection (25,26;38) adapted to co-operate with abutment means (27;39a,40a,41a,42a) in order to keep the ring in position on the support element.

6. Device according to claim 5, characterized in that the said projection (25,26;38), of which there is at least one, is provided on the ring (16;37) while the abutment means (27;39a,40a, 41a,42a) are provided on the support element (1;39,40,41, 42).

7. Device according to claim 5, characterized in that the said projection, of which there is at least one, is in the form of a claw (25,26).

8. Device according to claim 6, characterized in that the abutment means comprise at least one cavity (27) arranged in the support element (1) and adapted to receive the said projection (25,26), of which there is at least one, of the ring (16).

9. Device according to claim 8, characterized in that the abutment means comprise several cavities (27) angularly offset on the support element (1) to enable adjustment of the angular position for attaching the ring on the support element.

10. Device according to claim 9, characterized in that the projection is in the form of a claw, said claw (25,26) is connected elastically to the rest of the ring (16) and in that the said cavity (27), of which there is at least one, for receiving this claw opens to the outside of the support element to enable the introduction of a tool for disengaging the claw (25,26) from the cavity (27), in order to enable the moveable part of the device to be dismantled.

11. Device according to claim 5, characterized in that the abutment means comprise a shoulder (39a,40,-41a,42a) for retaining the said projection (38), of which there is at least one.

12. Device according to claim 11, characterized in that the shoulder contains at least one passage (43,44) for mounting the said projection of which there is at least one.

13. Device according to claim 5, characterized in that the retaining means have three projections (25,26) offset at 120°.

14. Device according to claim 1, characterized in that the retaining means and the complementary means have complementary toothed rims (51,56) provided on the ring (50) and the support element (52,53, 54,55).

15. Device according to claim 11, characterized in that the retaining means include in addition means (45;57) for locking the ring (37;50) in position on the support element (1;39,40,41,42;52,53,54, 55).

16. Device according to claim 15, characterized in that the means for locking the ring in position include an end stop for the sheath (45;57) of the cable for actuation of the dérailleur-gear, adapted to co-operate with at least one cavity (46;58) of the support element (39;52) and abutments (47;59) of the ring for locking the latter in position on the support element.

17. Device according to claim 16, characterized in that the support element contains several cavities (46;58) for receiving the end stop of the sheath (45;57), angularly offset to enable angular adjustment of the position of the ring and therefore of the moveable part of the device on the fixed part of the latter.

18. Device according to claim 16, characterized in that the ring has several abutments (47;59) angularly offset to enable angular adjustment of the position of the ring and therefore of the moveable part of the device on the fixed part of the latter.

19. Device according to claim 16, characterized in that the abutments of the ring contain at least one cavity (47;59) for receiving the end stop of the sheath (45;57).

20. Device according to claim 19, characterized in that the abutments have several angularly offset cavities for receiving the end stop of the sheath.

21. Device according to claim 1, characterized in that the support element (1) has a stepped and blind hole (1a) for receiving the actuation stud (4), this actuation stud being in the form of a stepped cylindrical part.

22. Device according to claim 1, characterized in that the control mechanism has a first washer (10;28) fixed to the end of the stud (4), rotated by the latter and of which one surface is adapted to co-operate with a complementary surface of a second washer (11;29) placed around the stud (4), above the first washer, locked against rotation relative to the fixed part (1) of the device and pressed against the first washer (10) by elastic means (12), themselves resting against a support area (15a) of the attachment means (16).

23. Device according to claim 22, characterized in that the first washer (10;28) is fixed on the end of the stud (4) by lateral projections (18) of the latter and complementary flat surfaces (19,20).

24. Device according to claim 22, in which the control mechanism is a friction mechanism, characterized in that the first and second washers (10,11) have flat surfaces in contact with each other.

25. Device according to claim 22, in which the control mechanism is an indexing mechanism, characterized in that the opposing surfaces of the washers (28,29) contain means (32,33,34,35) for indexing the relative position of the washers in relation to each other and therefore of the moveable part of the device relative to the fixed part.

26. Device according to claim 25, characterized in that the indexing means include recesses or notches (34,35) on one of the washers (29) adapted to co-operate with projections (32,33) on the other washer (28).

27. Device according to claim 26, characterized in that the projections (32,33) of one of the washers (28) are in one piece with this washer.

28. Device according to claim 26, characterized in that the projections of one of the washers (28) are constituted by balls a part of which engages in the cavities of this washer and which are adapted to co-operate with the recesses or notches (34,35) of the other washer.

29. Device according to claim 22, characterized in that the second washer (11;29) has recesses (21,22;30,31) adapted to co-operate with projections (23) of the support element, to ensure that it is locked against rotation relative to the latter.

* * * * *

UNITED STATES PATENT AND TRADEMARK OFFICE
CERTIFICATE OF CORRECTION

PATENT NO. : 5,052,242
DATED : October 1, 1991
INVENTOR(S) : Gunter Look, et al

It is certified that error appears in the above-identified patent and that said Letters Patent is hereby corrected as shown below:

Column 5, Line 31  " 389a of the support element 39 "  it should be

— 39a of the support element 39 —

Column 7, Line 16  " (27;45,46;39a,40a,41a,42a,57,58) "  it should be

— (27;45,46;39a,40a,41a,42a;56,57,58) —

Signed and Sealed this

Eighteenth Day of May, 1993

Attest:

MICHAEL K. KIRK

Attesting Officer      Acting Commissioner of Patents and Trademarks

UNITED STATES PATENT AND TRADEMARK OFFICE
CERTIFICATE OF CORRECTION

PATENT NO. : 5,052,242
DATED : October 1, 1991
INVENTOR(S) : Gunter Look and Regis Sinoquet It is certified that error appears in the above-indentified patent and that said Letters Patent is hereby corrected as shown below:

On the Title Page, Item [73]:

"Sachs Industries S. A." should read --Sachs Industries (HURET et MAILLARD REUNIS)--.

Signed and Sealed this

Nineteenth Day of April, 1994

Attest:

BRUCE LEHMAN

*Attesting Officer*  *Commissioner of Patents and Trademarks*